(12) United States Patent
Davis

(10) Patent No.: US 10,151,403 B2
(45) Date of Patent: Dec. 11, 2018

(54) ASYMMETRIC TORQUE MAGNETIC VALVE ACTUATOR

(71) Applicant: Edward P. Davis, Kihei, HI (US)

(72) Inventor: Edward P. Davis, Kihei, HI (US)

( * ) Notice: Subject to any disclaimer, the term of this patent is extended or adjusted under 35 U.S.C. 154(b) by 0 days.

(21) Appl. No.: 15/859,125

(22) Filed: Dec. 29, 2017

(65) Prior Publication Data

US 2018/0187794 A1 Jul. 5, 2018

Related U.S. Application Data

(60) Provisional application No. 62/440,710, filed on Dec. 30, 2016.

(51) Int. Cl.
| | | |
|---|---|---|
| *F16K 31/08* | (2006.01) | |
| *F16K 31/524* | (2006.01) | |
| *F16K 31/04* | (2006.01) | |
| *F16K 31/60* | (2006.01) | |
| *F16K 31/50* | (2006.01) | |
| *F16K 31/53* | (2006.01) | |
| *H02K 49/10* | (2006.01) | |
| *H02K 7/14* | (2006.01) | |

(52) U.S. Cl.
CPC .......... *F16K 31/524* (2013.01); *F16K 31/045* (2013.01); *F16K 31/048* (2013.01); *F16K 31/088* (2013.01); *F16K 31/508* (2013.01); *F16K 31/535* (2013.01); *F16K 31/602* (2013.01); *H02K 49/106* (2013.01); *F16K 31/084* (2013.01); *F16K 31/52408* (2013.01); *H02K 7/14* (2013.01); *H02K 2213/09* (2013.01)

(58) Field of Classification Search
CPC .. F16K 37/0008; F16K 31/602; F16K 31/045; F16K 31/084; F16K 31/524; F16K 31/088; F16K 31/52408; F16K 17/0406; F16K 31/535
USPC ................................ 251/111, 252, 232, 231
See application file for complete search history.

(56) References Cited

U.S. PATENT DOCUMENTS

| | | | | |
|---|---|---|---|---|
| 644,224 | A | * | 2/1900 | Dreckmann ............... F16K 3/26 251/231 |
| 1,268,128 | A | * | 6/1918 | Kurtz ..................... F02M 23/09 123/587 |
| 2,289,574 | A | | 7/1942 | Carlson |
| 2,346,904 | A | | 4/1944 | Carlson |
| 2,427,810 | A | * | 9/1947 | Reilly ..................... F01L 31/10 251/232 |
| 3,105,147 | A | | 9/1963 | Weilbach et al. |
| 3,347,262 | A | | 10/1967 | Gibson |
| 3,656,710 | A | * | 4/1972 | Shaw ..................... B65D 88/54 251/144 |

(Continued)

OTHER PUBLICATIONS

Author unknown; International Search Report and Written Opinion of PCT/US2017/069103; dated Apr. 26, 2018; 10 pgs.

*Primary Examiner* — Umashankar Venkatesan
(74) *Attorney, Agent, or Firm* — K&L Gates LLP

(57) ABSTRACT

Various devices and techniques related to magnetically-actuated valves are generally described. In some examples, magnetically-actuated valves may include an asymmetric torque magnetic valve actuator effective to generate a first amount of torque when disposed in a first orientation and a second amount of torque when disposed in a second orientation. In some other examples, the valves may include mechanical stops that prevent binding of the valves in a closed or open position.

17 Claims, 12 Drawing Sheets

(56) References Cited

U.S. PATENT DOCUMENTS

| | | | |
|---|---|---|---|
| 3,747,892 A | 7/1973 | Gigantino et al. | |
| 4,280,679 A * | 7/1981 | Shaw | F16K 51/00 251/144 |
| 4,284,262 A | 8/1981 | Ruyak | |
| 4,327,892 A | 5/1982 | Ruyak | |
| 4,382,578 A | 5/1983 | Ruyak | |
| 4,384,703 A | 5/1983 | Ruyak et al. | |
| 4,631,778 A * | 12/1986 | Kocon | B65D 90/10 16/337 |
| 4,653,951 A * | 3/1987 | Bodle | B64G 1/222 16/341 |
| 4,671,486 A | 6/1987 | Giannini | |
| 4,792,113 A | 12/1988 | Eidsmore | |
| 5,009,388 A | 4/1991 | Pei-gi et al. | |
| 5,029,061 A | 7/1991 | Shek | |
| 5,345,968 A | 9/1994 | Day | |
| 5,398,013 A | 4/1995 | Suzuki et al. | |
| 5,582,206 A | 12/1996 | Brillant | |
| 5,611,368 A | 3/1997 | Hwang et al. | |
| 5,785,296 A | 7/1998 | Peube et al. | |
| 6,161,722 A | 12/2000 | Sooudi et al. | |
| 6,231,027 B1 | 5/2001 | Baker et al. | |
| 6,325,354 B1 | 12/2001 | Hoen et al. | |
| 6,332,451 B1 | 12/2001 | Sato et al. | |
| 6,591,507 B2 * | 7/2003 | Kobayashi | A01D 34/90 30/276 |
| 6,918,574 B2 | 7/2005 | Hallden et al. | |
| 7,007,915 B2 | 3/2006 | Vincent et al. | |
| 7,363,942 B2 | 4/2008 | Fernandez | |
| 9,285,055 B2 | 3/2016 | Søraas et al. | |
| 9,377,121 B2 | 6/2016 | Burgess et al. | |
| 9,797,521 B1 | 10/2017 | Davis | |
| 2005/0126637 A1 | 6/2005 | Lee et al. | |
| 2008/0073606 A1 | 3/2008 | Liantonio | |
| 2010/0294968 A1 | 11/2010 | Teague, Jr. | |
| 2012/0097873 A1 | 4/2012 | Decker et al. | |
| 2016/0138721 A1 | 5/2016 | Burgess et al. | |

* cited by examiner

ASYMMETRIC TORQUE MAGNETIC VALVE ACTUATOR

CROSS-REFERENCE TO RELATED APPLICATIONS

This application claims the benefit of U.S. Provisional Application No. 62/440,710 filed Dec. 30, 2016, the disclosure of which is incorporated herein by reference in its entirety.

FIELD

This application relates to valve technology and, more specifically, to valve actuator mechanisms.

BACKGROUND

Valves often develop leaks as they age. Leaking valves can be annoying, wasteful, and can cause damage in residential settings, but can be far more problematic in industrial applications. Factory lines may need to be shut down to repack or replace valves, resulting in lost production and unnecessary downtime. Leaks can cause environmental damage and safety issues. Steam leaks can scald and even kill workers. The Environmental Protection Agency (EPA) is concerned about pollution resulting from leaky valve stem seals in factories and oil fields. In extreme cases, such as semiconductor manufacturing, even microscopic leaks can be fatal—breathing tanks and hazmat suits are often required to clean up after leaks are detected in semiconductor foundries.

Most traditional valves usually have two moving seals: (1) the Seat where the flow of material through the valve is allowed, controlled, and shut off, and (2) the Stem seal that keeps the material from leaking out of the hole for the valve handle. Studies have shown that some high percentage of the leaks encountered in real world valves are associated with the stem seals because they tend to entrain dirt and grit which can erode the mating surfaces over time.

Traditional valves contain stem seals that often degrade or leak over time. Previous seal-less valves often employed bending or flexing components such as bellows or membranes that can degrade or fatigue and also leak long term. Additionally, previous generations of magnetic valves usually contained internal magnets and/or operated in a linear solenoid type manner making high temperature operation difficult to achieve, and often requiring continuous power to maintain their position.

SUMMARY

Systems and methods are provided for magnet-actuated valves with asymmetric torque and unidirectional rotational stops.

In accordance with various embodiments of the present invention, a valve assembly is generally described. In some examples, the valve assembly may comprise a valve body defining an enclosure. In some other examples, the valve assembly may further comprise a stem disposed in the enclosure. In various other examples, the valve assembly may further comprise a movable valve actuator component disposed in the enclosure and operatively coupled to a first end of the stem. In some examples, the valve assembly may further comprise an internal actuator having a ferromagnetic portion. In other examples, the internal actuator may contain magnets. In various examples, the internal actuator may be operatively coupled to a second end of the stem. In some other examples, the valve assembly may further comprise an external actuator operatively coupled to an exterior of the valve body. In some examples, the external actuator may comprise a first magnetic pole section adjacent to the valve body. In some other examples, the external actuator may comprise a second magnetic pole section adjacent to the valve body. In some examples, when the external actuator is rotated in one direction it may generate more torque on the internal actuator than when it rotates in the other direction. In other examples, the internal actuator may encounter a rotational stop, such that it cannot rotate further in one direction, but is free to rotate in the other direction. In some examples, these approaches may be combined, such that torque is limited in one direction, and position is limited in the other. In various further examples, the internal actuator may be a ferromagnetic internal actuator.

In accordance with embodiments of the present invention, a valve assembly is provided. The valve assembly comprises: an internal actuator comprising: a first actuator component comprising an interfacing surface and rotational axis point, wherein the interfacing surface is a first distance from the rotational axis point; and a second actuator component comprising an interfacing end rotatably coupled to the first actuator component at the rotational axis point, and a free end distal to the coupled end. The interfacing end comprises: an abutting surface a second distance from the rotational axis point, the second distance being greater than the first distance, wherein the abutting surface abuts the interfacing surface of the first actuator component when the first actuator component is aligned with the second actuator component at a first angular displacement such that rotation of the second actuator component in a first direction beyond the first angular displacement causes the abutting portion to apply a force onto the interfacing surface of the first actuator component, thereby resulting in coordinated rotation of the first actuator component with the second actuator component; and a recessed surface a third distance from the rotational axis point, the third distance being less than or equal to the first distance, wherein rotation of the second actuator component in a second direction opposite the first direction results in rotation of the second actuator component relative to the first actuator component.

The valve assembly may further comprise a valve body defining an enclosure, wherein the internal actuator is disposed in the enclosure; and an external actuator coupled to an exterior of the valve body, the external actuator comprising a first magnetic pole section and a second magnetic pole section adjacent to the valve body; wherein, when the first actuator component is aligned with the second actuator component at the first angular displacement, the first magnetic pole section is magnetically coupled to the first actuator component and the second magnetic pole section is magnetically coupled to the free end of the second actuator component, and rotation of the external actuator in the first direction effectuates rotation of the internal actuator in the first direction.

In various embodiments, the internal actuator comprises a ferromagnetic material, a permanent magnet, or an impermanently magnetic material.

In some embodiments, the abutting surface comprises a substantially planar surface; and the recessed surface comprises a curved surface.

In some embodiments, the valve assembly further comprises a valve member effective to open and close a fluid flow path of the valve assembly; and a valve stem operatively coupled to the internal actuator and to the valve member.

In some embodiments, the valve assembly further comprises a pin or other physical protrusion coupled to the valve stem, wherein the pin or other physical protrusion is arranged so as to contact a portion of the valve assembly to prevent further movement of the valve member in the first direction.

Typical magnetically-actuated valves often become stuck in either their open or closed positions (or both), especially after being over-tightened, over-loosened, having been left in one position for an extended period of time, or when handling sticky or corrosive substances. Magnetic valves may sometimes become stuck in a closed position due to friction of the seal, the duration of time that the valve has been closed, corrosion, properties of the substances flowing through the valve, and/or even over-tightening the valve. For certain types of valves such as gate valves, globe valves, and butterfly valves, it may be desirable to limit the closing torque available from the magnetic valve coupling to protect the valve seat from over-tightening, but if the valve becomes stuck in the closed position, it may be desirable to have additional torque transmitting capability in the opening direction.

Magnetic valves often get stuck in the closed position simply because the maximum torque that can be transmitted by a traditional magnetic valve actuator is typically equal in both directions, and hence a component such as a valve gate cannot always be backed out of a position into which it was placed with maximum torque (especially if it has been in that position for a long period of time and there is corrosion or other degradation present). Other approaches to solving this problem such as return springs located in or around the valve seat may interfere with the fluid flow through the valve or catch debris that could interfere with the flow.

Some embodiments of this invention prevent magnetic valves from becoming stuck in a particular position (typically the closed position) by providing higher torque handling capability in one rotary direction (usually the valve opening direction) relative to the other rotary direction (e.g., the valve closing direction). As previously described, providing higher torque handling capability in one direction relative to the other may offer improvements relative to other approaches such as springs that may interfere with the fluid flow characteristics of the valve especially when employed to prevent a valve from becoming stuck in the closed position. The various asymmetric torque magnetic valve actuators described herein may be located in the actuator portion of the valve away from the main path of fluid flow through the valve. The various asymmetric torque magnetic valve actuators described herein may be particularly useful for valves that close by pressing a moving actuator component against a fixed seat such as gate, globe, and/or butterfly valves, as such particular varieties of valves may be especially prone to becoming stuck in a closed or open position. Furthermore, the various asymmetric torque magnetic valve actuators described herein may offer improved reliability relative to previous solutions such as springs that flex, fatigue, and/or degrade over time.

Other embodiments of the various asymmetric torque magnetic valve actuators described herein may prevent magnetic valves from becoming stuck in a particular position (often the open position, sometimes both open and closed) by providing a positive rotational stop feature that prevents rotation in one direction past a specified position, but allows free rotation in the other direction. Positive rotational stops described herein may be particularly useful for valves that open and close by position, such as ball and plug valves, and/or valves that open via clearing a moving actuator component from the path of the fluid flow such as gate, globe, and butterfly valves. By stopping rotation of the actuator in one direction past a specified rotational position, while allowing free rotation in the other, a valve can easily be adjusted to be fully open (or fully closed) while avoiding binding or stuck valve conditions. By providing this stop in the rotation of the actuator itself (rather than rotation or translation of an ancillary member), the possibility of binding is greatly reduced, and the ability to rotate freely in the other direction may be maintained. In general, positive rotational stops can be employed in instances where a valve state is specified by position alone, such as, e.g., fully opened or closed ball or plug valves, or the fully opened position of a gate, globe, or butterfly valve. Asymmetric torque or force type mechanisms can be employed where a valve state (typically closed) is defined by a specified force against a valve seat such as for a fully closed gate or globe valve. Furthermore, because an asymmetric torque mechanism may have a preferential torque direction throughout the extent of valve mechanism travel, it may be desirable to stop rotation with a non-binding, positional type stop at the opposite end of travel from where an asymmetric torque mechanism is beneficial.

For a valve containing a lead screw, such as a gate or globe valve or a travelling nut actuated ball valve, the various asymmetric torque magnetic valve actuators described herein may employ pins, nubs, or other mechanical features and/or physical protrusions to stop the rotation of the lead screw in the opposite (typically opening) rotational direction prior to the point that any component would become stuck. For example, in the case of a lead-screw driven gate valve, the asymmetric torque magnetic valve actuator may limit the closing torque to the specified value for the valve seat. Additional torque may be available in the opening direction in case the valve sticks, and two opposing pins (one on the lead screw or stem, the other on the gate) may stop the rotation of the lead screw relative to the gate prior to the lead-screw bottoming out in the gate (or the gate encountering any other object to potentially bind to), hence preventing the gate from becoming stuck in the open position. In various examples, the positive rotational stops may be referred to herein as "pin type rotational stops"; however, other shapes and/or features apart from pins may be used to instead impede the actuation of the valve beyond a particular point. Accordingly, use of the term "pin type rotational stop" describes one example embodiment of rotational stops, in accordance with various embodiments of the present disclosure.

As previously described, magnetic valves may sometimes become stuck in the closed position due to the torque limits inherent in their magnetic couplings if those limits are equal in both rotational directions (opening and closing).

The asymmetric torque magnetic valve actuators described herein may overcome this problem by allowing the torque capability of the magnetic coupling to be higher in one direction than the other. For example, the various asymmetric torque magnetic valve actuators described herein could be used to limit the closing torque on the valve to the recommended valve seating torque (in order to provide optimal valve seat life), but still be less than the torque available to open the valve, to reduce or eliminate the possibility that the valve will become stuck in the closed position. Additionally, in some embodiments, a pair of stops or pins that contact each other may be used to stop rotation of the lead screw once the valve reaches the fully opened valve position. Such stops or pins may reduce or eliminate the possibility that the valve becomes stuck in either position (closed or open).

The various asymmetric torque magnetic valve actuators described herein may help to prevent magnetic valves from becoming stuck, which is a potential problem for many magnetically-actuated valves. This various methods and actuators described herein may offer improvements over previous attempts to prevent valve sticking, such as use of springs. As previously described, springs may interfere with the fluid flow characteristics of the valve especially when employed to prevent a valve from becoming stuck in the closed position. Furthermore, springs may bend, flex, fatigue and/or break over time.

Stuck valves require maintenance—often with the system shut down, which can reduce reliability and availability of the system. Valves that are prone to sticking often cannot be hermetically sealed, such as by welding, soldering and/or brazing the valve cover shut, because of the necessity of being able to access the internal portions of the valve actuator in the event the valve becomes stuck. As previously described, return springs located in or around the valve seat may interfere with the fluid flow through the valve or catch debris that could interfere with the flow.

The various asymmetric torque magnetic valve actuators described herein may be used to produce high-reliability magnetic valves and may significantly reduce or eliminate sticking of valves in one or more of the open and closed positions.

Still other embodiments of the present disclosure will become readily apparent to those skilled in the art from the following detailed description, which describes embodiments illustrating various examples of the invention. As will be realized, the invention is capable of other and different embodiments and its several details are capable of modifications in various respects, all without departing from the spirit and the scope of the present invention. Accordingly, the drawings and detailed description are to be regarded as illustrative in nature and not as restrictive.

DETAILED DESCRIPTION

In the following description, reference is made to the accompanying drawings that illustrate several embodiments of the present disclosure. It is to be understood that other embodiments may be utilized and system or process changes may be made without departing from the spirit and scope of the present disclosure. The following detailed description is not to be taken in a limiting sense, and the scope of the embodiments of the present invention is defined only by the claims of the issued patent. It is to be understood that drawings are not necessarily drawn to scale.

Various embodiments of the present disclosure provide improved systems and methods for actuating valves using one or more asymmetric torque magnetic valve actuators as described herein. These embodiments may provide improved durability and leak-resistance and may prevent valves from sticking in an open and/or in a closed position. Additionally, the various asymmetric torque magnetic valve actuators described herein overcome various technical challenges presented when using conventional magnetic valves.

Figure 1:
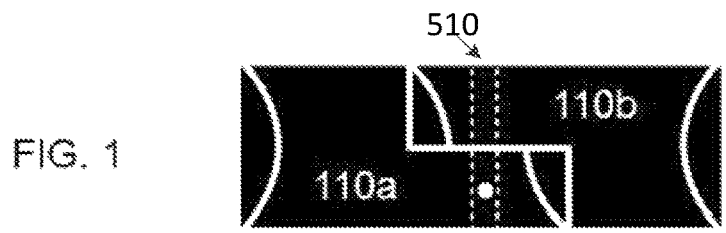
FIG. 1 depicts an assembled side view (perpendicular to the axis of rotation) of a ferromagnetic magnet-actuated valve actuator that exhibits asymmetric torque, in accordance with some aspects of the present disclosure.

FIG. 1 depicts an assembled side view (perpendicular to the axis of rotation) of a ferromagnetic magnet-actuated valve actuator that provides asymmetric torque, in accordance with some aspects of the present disclosure. The ferromagnetic magnet-actuated valve actuator depicted in FIG. 1 comprises an internal actuator comprising actuator components 110a and 110b. Actuator components 110a and 110b may comprise a ferromagnetic material, such that magnetic flux is able to flow through actuator components 110a and 110b. In some further examples, actuator components 110a and/or 110b may comprise permanent magnets (e.g., neodymium magnets). As depicted in FIG. 1, actuator components 110a and 110b overlap along the axis of rotation (shown in dashed lines) of the valve, and form a magnetic flux path through the interior of the valve when in the high torque position depicted in FIG. 1 and described in further detail below. In at least some examples, actuator components 110a and 110b may be sealed inside an enclosure (e.g., the body) of a valve and may therefore sometimes be referred to as an "internal actuator". Actuator components 110a and 110b may be coupled to the stem of the valve such that rotating the actuator components 110a and 110b in turn may cause rotation of the stem which may be effective to open or close the valve, depending on the direction of rotation.

Figure 2:
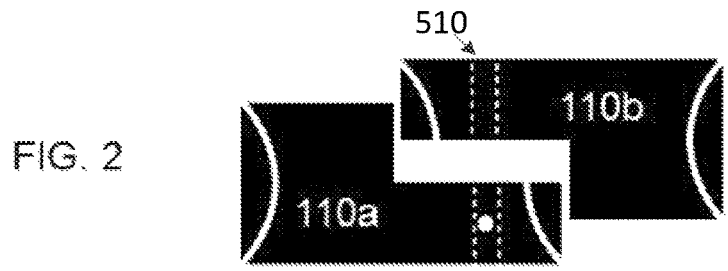
FIG. 2 depicts a disassembled side view (perpendicular to the axis of rotation) of a ferromagnetic magnet-actuated valve actuator that exhibits asymmetric torque, in accordance with some aspects of the present disclosure.

FIG. 2 depicts a disassembled side view (perpendicular to the axis of rotation) of the ferromagnetic magnet-actuated valve actuator of FIG. 1. As depicted in FIG. 2, in some examples, at least a portion of actuator components 110a and 110b may overlap one another along an axis parallel to the axis of rotation of the valve. As described in further detail below, actuator components 110a and 110b of the ferromagnetic magnet-actuated valve actuator may exhibit asymmetric torque depending on the rotational direction in which the valve is being actuated, in accordance with some aspects of the present disclosure.

Figure 3:
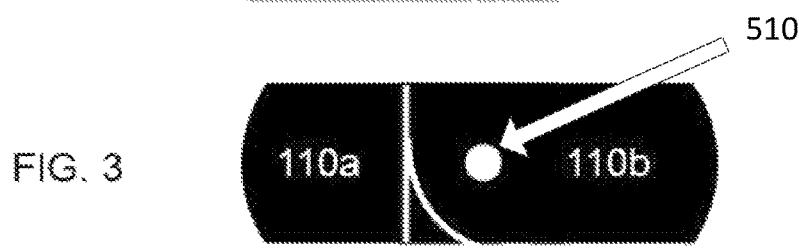
FIG. 3 depicts an assembled top view (along the axis of rotation) of a ferromagnetic magnet-actuated valve actuator that exhibits asymmetric torque, in its locked higher torque position, in accordance with some aspects of the present disclosure.

FIG. 3 depicts an assembled top view (along the axis of rotation) of the ferromagnetic magnet-actuated valve actuator of FIGS. 1 and 2 that exhibits asymmetric torque. In the example depicted in FIG. 3, actuator components 110a and 110b are positioned in the higher-torque, aligned orientation (sometimes referred to herein as the "locked" orientation or position), wherein a longitudinal axis of actuator component 110b is aligned with or substantially aligned with a longitudinal axis of actuator component 110a, in accordance with some aspects of the present disclosure. FIG. 3 shows that actuator components 110a and 110b overlap along the axis of rotation of the valve, and form a direct magnetic flux path (e.g., from left to right through actuator components 110a and 110b and/or from right to left through actuator components 110a and 110b) when in the higher-torque (in this case aligned) orientation. In some examples, actuator components 110a and 110b may be positioned in the higher torque, aligned orientation shown in FIG. 3 when a valve including actuator components 110a and 110b is being opened (e.g., typically by rotating an external actuator of the valve in a counter clockwise direction).

Figure 4:
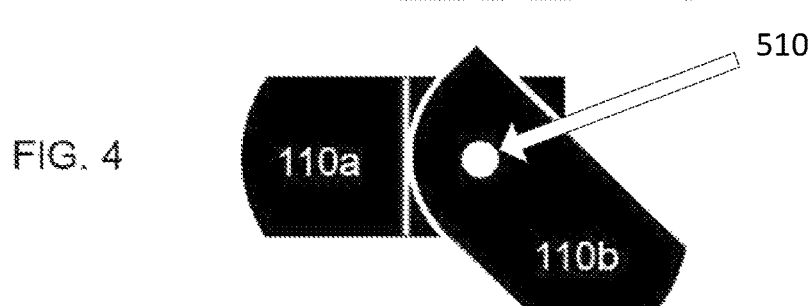
FIG. 4 depicts an assembled top view (along the axis of rotation) of a ferromagnetic magnet-actuated valve actuator that exhibits asymmetric torque, in its bent lower torque position, in accordance with some aspects of the present disclosure.

FIG. 4 depicts an assembled top view (along the axis of rotation) of the ferromagnetic magnet-actuated valve actuator of FIGS. 1-3 that exhibits asymmetric torque. In the example depicted in FIG. 4, actuator components 110a and 110b are positioned in the lower-torque, deflected orientation. In FIG. 4, actuator component 110b is deflected at an angle with respect to the longitudinal axis of actuator component 110a. FIG. 4 shows that actuator components 110a and 110b overlap along the axis of rotation of the valve. In various examples and as described in further detail below, the magnetic flux path flowing through actuator components 110a and 110b may be deformed when actuator components 110a and 110b are positioned in the lower-torque, deflected orientation such as the example lower-torque deflected orientation depicted in FIG. 4.

Figure 5:
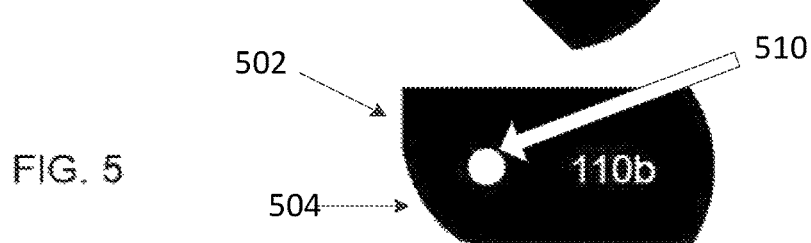
FIG. 5 depicts the upper (along the axis of rotation) pivoting portion of a ferromagnetic magnet-actuated valve actuator that exhibits asymmetric torque, in accordance with some aspects of the present disclosure.

FIG. 5 depicts actuator component 110b of the ferromagnetic magnet-actuated valve actuator of FIGS. 1-4. In at least some examples, at least a portion of actuator component 110b may overlap actuator component 110a. However, in other examples, actuator component 110a may overlap actuator component 110b, and in at least some other examples, actuator components 110a and 110b may be formed and/or oriented so as to impart asymmetric torque without overlapping (e.g., while disposed in a planar orientation). For example, actuator components 110*a* and 110*b* may be mated such that actuator components 110*a* and 110*b* may be effective to impart asymmetric torque as described herein.

In some examples and as depicted in FIG. 5, the portion of actuator component 110*b* that interfaces with actuator component 110*a* may include an abutting portion (e.g., flat portion 502) and a recessed portion (e.g., curved or contoured portion 504). Actuator component 110*b* may be effective to rotate around axis 510. Flat portion 502 may contact an interfacing surface 602 of actuator component 110*a* and may prevent further rotation of actuator component 110*b* relative to a position of actuator component 110*a*. This is because the radial distance from the rotation axis to the end of flat portion 502 is greater than the distance from the rotation axis to the surface 602 of actuator component 110*a*. For example, in the higher torque, aligned orientation depicted in FIG. 3, surface 602 of actuator component 110*a* prevents actuator component 110*b* from rotating any further in a counterclockwise direction relative to actuator component 110*a*, because the flat portion 502 of actuator component 110*b* may abut and directly contact surface 602 of actuator component 110*a*. However, actuator component 110*b* may rotate in a clockwise direction from the aligned orientation depicted in FIG. 3 to the deflected orientation depicted in FIG. 4 because the curved portion 504 of actuator component 110*b* "rolls along" the surface 602 of actuator component 110*a*. In this range of travel, the radial distance from the rotation axis 510 to the curved portion 504 is less than or equal to the distance from the rotation axis 510 to the surface 602 of actuator component 110*a*. Flat portion 508 may prevent actuator component 110*b* from rotating beyond a particular angle of deflection. For example, when flat portion 508 abuts and directly contacts surface 602 of actuator component 110*a*, surface 602 of actuator component 110*a* may prevent further rotation (e.g., deflection) of actuator component 110*b* in the clockwise direction. It should be noted that the particular shapes of the actuator components 110*a*, 110*b* and the various directions of rotation described in the examples above are by way of example only and different shapes and directions of rotation may be used in accordance with the various valve assemblies described herein.

Figure 6:
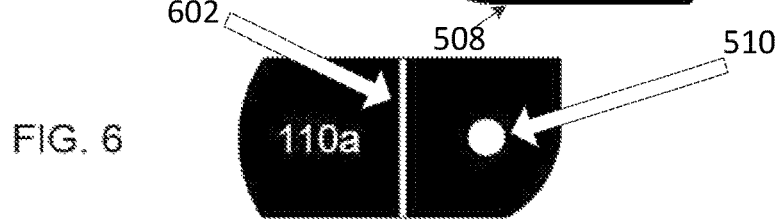
FIG. 6 depicts the lower (along the axis of rotation) fixed portion of a ferromagnetic magnet-actuated valve actuator that exhibits asymmetric torque, in accordance with some aspects of the present disclosure.

FIG. 6 depicts actuator component 110*a* of the ferromagnetic magnet-actuated valve actuator of FIGS. 1-4. In at least some examples, actuator component 110*a* may overlap with actuator component 110*b*. However, in other examples, actuator component 110*b* may overlap actuator component 110*a*, and in at least some other examples, actuator components 110*a* and 110*b* may be formed and/or oriented so as to impart asymmetric torque without overlapping. For example, actuator components 110*a* and 110*b* may be mated, hinged, or may otherwise interface such that actuator components 110*a* and 110*b* may be effective to impart asymmetric torque as described herein.

Figure 7:
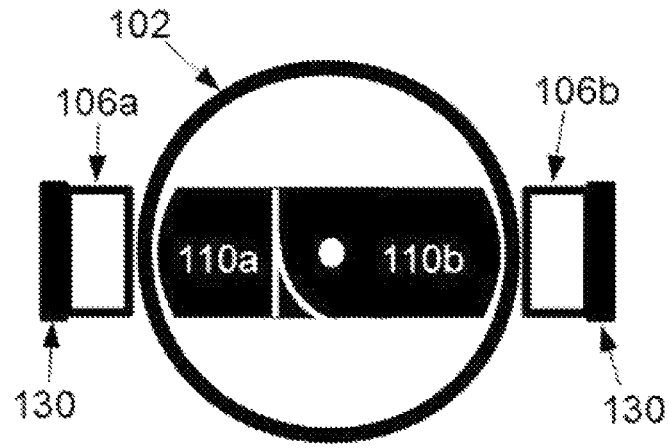
FIG. 7 depicts an assembled top view (along the axis of rotation) of the inner, outer, and sealed enclosure portions of a magnet-actuated valve actuator that exhibits asymmetric torque, in its rest position, in accordance with some aspects of the present disclosure.

FIG. 7 depicts an assembled top view (along the axis of rotation) of a magnet-actuated valve actuator that exhibits asymmetric torque, in a rest position (e.g., in an orientation with little to no torque applied by the external actuator 130), in accordance with some aspects of the present disclosure. FIG. 7 depicts the internal portion of the actuator components 110*a* and 110*b* in an aligned orientation as attracted by external magnets 106*a*, 106*b* and external actuator 130 (e.g., a ferromagnetic return path for magnetic flux that completes a magnetic circuit between the external magnets 106*a*, 106*b*) through the sealed valve body 102 through ferromagnetic actuator components 110*a* and 110*b*.

Figure 8:
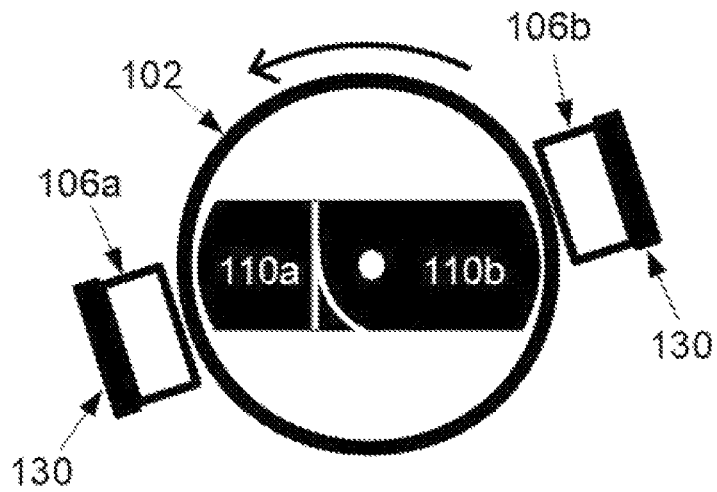
FIG. 8 depicts an assembled top view (along the axis of rotation) of the inner, outer, and sealed enclosure portions of a magnet-actuated valve actuator that exhibits asymmetric torque, in its higher torque, aligned orientation, in accordance with some aspects of the present disclosure.

FIG. 8 depicts an assembled top view (along the axis of rotation) of the magnet-actuated valve actuator of FIG. 7 in the higher torque, aligned orientation, in accordance with some aspects of the present disclosure. FIG. 8 shows the internal portion of the actuator components 110*a* and 110*b* in an aligned, locked configuration as attracted by external magnets 106*a*, 106*b* and external actuator 130. Magnetic flux flows from external magnet 106*a*, through the aligned and locked actuator components 110*a* and 110*b* and to the opposing external magnet 106*b*. In other examples, magnetic flux may flow in the opposite direction depending on the polarity of the external magnets 106*a*, 106*b*. A return path for the magnetic flux is completed by a ferromagnetic external actuator 130 (e.g., an iron external actuation mechanism). In the example depicted in FIG. 8, when the actuation mechanism is actuated in the counterclockwise direction, actuator components 110*a* and 110*b* are held in an aligned, straightened orientation, and both transmit torque to the valve mechanism (e.g., to rotating the stem 104 of the gate valve depicted in FIG. 10) due to the stem's coupling to at least one of actuator components 110*a* and 110*b*.

Figure 9:
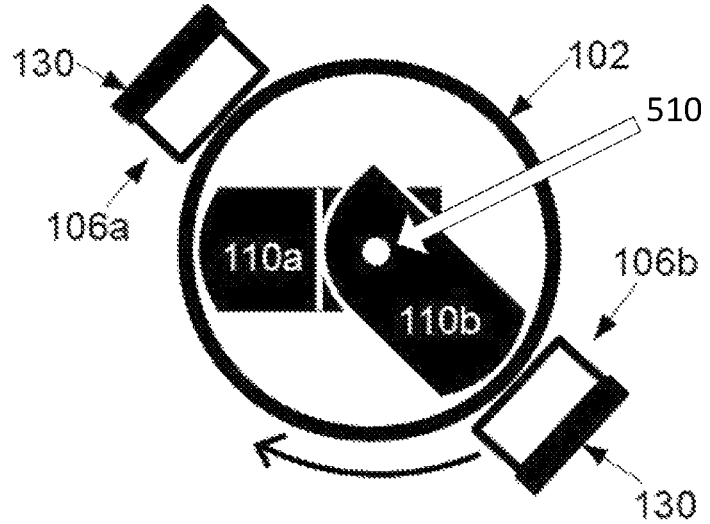
FIG. 9 depicts an assembled top view (along the axis of rotation) of the inner, outer, and sealed enclosure portions of a magnet-actuated valve actuator that exhibits asymmetric torque, in its lower torque, deflected orientation, in accordance with some aspects of the present disclosure.

FIG. 9 depicts an assembled top view (along the axis of rotation) of the magnet-actuated valve actuator of FIGS. 7-8 in the in the lower torque, deflected orientation, in accordance with some aspects of the present disclosure. FIG. 9 depicts the actuator components 110*a* and 110*b* in a deflected, unlocked configuration as attracted by external magnets 106 and external actuator 130, through the sealed valve body 102, and with actuator component 110*a* transmitting torque to the valve mechanism and actuator component 110*b* freely following one of the external magnets 106 by the knuckle mechanism formed by actuator components 110*a* and 110*b* deflecting when the actuation mechanism is actuated in the clockwise direction. In various examples, actuator component 110*a* may be fixed to the valve stem such that actuator component 110*a* rotates with the valve stem. Actuator component 110*b* may rotate within the sealed valve body 102 around rotation axis 510. As such, actuator components 110*a*, 110*b* may be described as a "knuckle" interface whereby actuator component 110*b* can deflect from a position in which actuator component 110*b* is aligned with actuator component 110*a* (e.g., as depicted in FIGS. 7 and 8) to a position where actuator component 110*b* is deflected relative to actuator component 110*a* (e.g., as depicted in FIG. 9). However, in the knuckle configuration, actuator component 110*b* is unable to deflect past the aligned position when rotating counterclockwise (at least in the example embodiments depicted in FIGS. 3-9) due to the shapes and interface between the actuator components 110*a*, 110*b*.

In an example, as depicted in FIGS. 1-4, actuator components 110*a*, 110*b* may be designed in such a way that actuator component 110*b* deflects when the actuation mechanism is rotated in the clockwise direction. Depending on the shape of the actuator components 110*a*, 110*b*, the amount of deflection may be limited to a particular angle of deflection. For example, the angle of deflection of actuator component 110*b* relative to actuator component 110*a* may be less than 90°, less than 95°, less than 70°, less than 80°, or some other suitable angle of rotation.

Conversely, actuator components 110*a*, 110*b* may be designed in such a way that actuator component 110*b* aligns with (or substantially aligns with (e.g., to within 10%) actuator component 110*a* when the actuation mechanism is rotated in the counterclockwise direction (e.g., as depicted in FIG. 8). It is to be appreciated that actuator components 110*a*, 110*b* may instead be designed to align when rotated in the clockwise direction and deflect when rotated in the counterclockwise direction, according to the desired implementation.

In various examples, actuator components 110a, 110b may experience higher torque when disposed in the aligned orientation depicted in FIG. 8 relative to the deflected orientation depicted in FIG. 9. In the aligned orientation depicted in FIG. 8, the actuator components 110a, 110b form a linear pathway for magnetic flux flowing from one magnet (e.g., external magnet 106a), 106b, through the actuator components 110a, 110b, to the other magnet (e.g., external magnet 106b) and completing the magnetic circuit through the ferromagnetic external actuator 130 (see, e.g., FIG. 10 for a cross-sectional view of the external actuator 130). Conversely, when in the deflected orientation depicted in FIG. 9, the path of the magnetic flux flowing through the actuator components 110a, 110b may be deformed by the point at which actuator component 110b begins to impart torque to the internal actuation mechanism (such as stem 104 depicted in FIGS. 10-13) and may therefore impart a lower torque to the internal actuator (and therefore to the actuation mechanism) relative to the torque imparted when the actuator components 110a, 110b of the internal actuator are aligned. Accordingly, in some examples, the deflected orientation of actuator components 110a, 110b may be used to prevent over-tightening of the valve which may, in turn, cause the valve to become stuck in a first position (e.g., the closed position). Similarly, the aligned orientation of actuator components 110a, 110b may be used to generate maximum torque when opening a closed valve.

Figure 10:
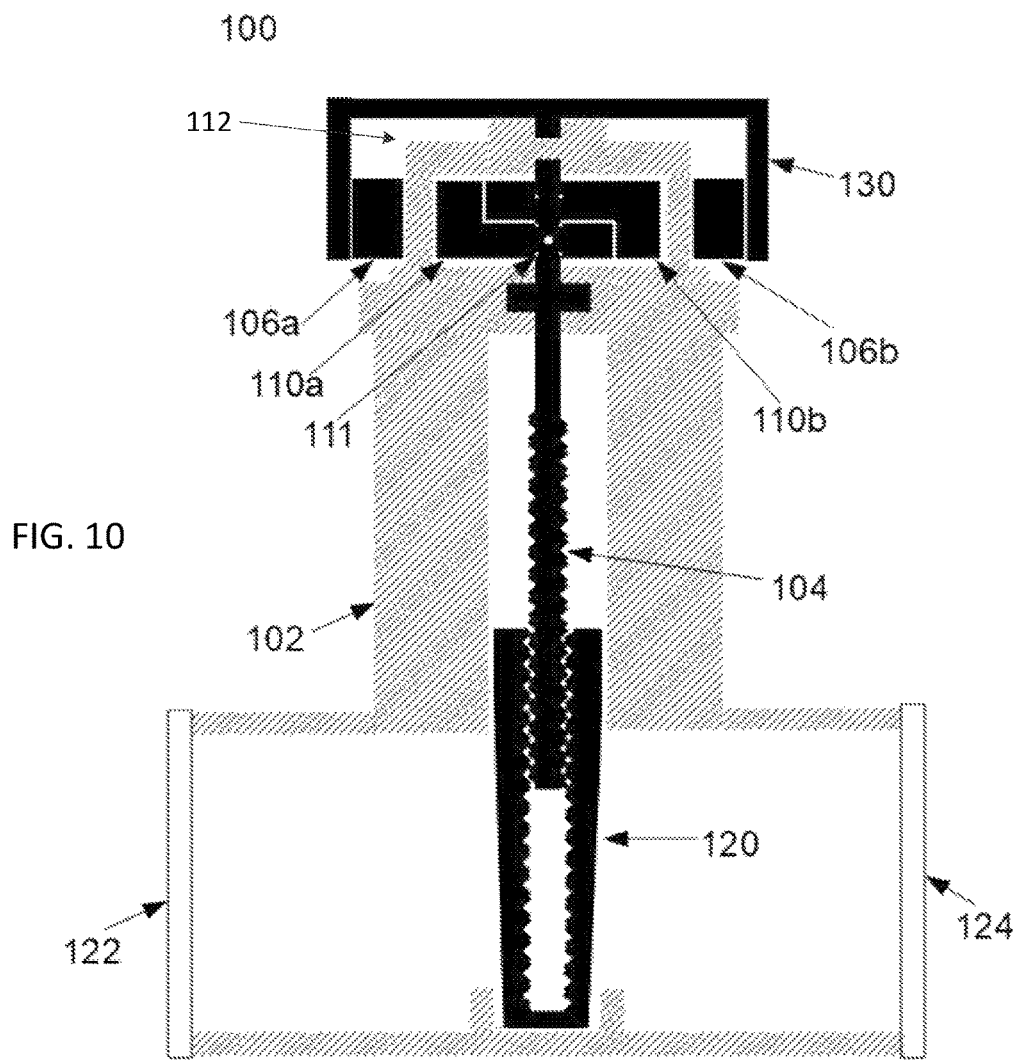
FIG. 10 depicts an assembled cross-sectional side view (perpendicular to the axis of rotation) of a magnet-actuated gate valve with ferromagnetic actuator in its closed position that exhibits asymmetric torque, in accordance with some aspects of the present disclosure.

FIG. 10 depicts a cross-sectional side view of a magnet-actuated gate valve 100 with ferromagnetic actuator in its closed position that exhibits asymmetric torque, in accordance with various aspects of the present disclosure. Valve 100 includes a body 102. In various examples, valve body 102 may be formed in such a way as to form an enclosure. In various examples, the internal actuator including actuator components 110a, 110b may be disposed within the enclosure. Valve body 102 may be the outer casing of valve 100 and may comprise any desired material depending on the desired application for the particular valve 100. In various examples, body 102 may comprise various metallic materials such as brass, copper, steel, bronze, gunmetal, alloy steels, non-400 series stainless steels, iron or the like. In some examples, body 102, or portions of body 102, may comprise a metal that has a low magnetic permeability. In some examples, portions of valve body 102 (e.g., the portion of valve body 102 in FIG. 1 depicted above and/or surrounding cavity 112) may comprise a material with a low magnetic permeability in order to avoid shunting magnetic flux through the body of the valve, thereby weakening the magnetic actuation mechanism described herein. In some examples, the portion of valve body 102 adjacent to cavity 112 may comprise a metal that has a low magnetic permeability. For example, the metal may comprise, e.g., an Austenitic stainless steel (such as 300 series stainless), aluminum, copper, brass, titanium, and alloys thereof, and may exhibit a relative magnetic permeability (e.g., the ratio of magnetic permeability of a material vs. the magnetic permeability of free space) less than 10. In some embodiments the metal may exhibit a relative magnetic permeability of about 1. In still other examples, body 102 may comprise one or more plastics and/or composite materials. Different materials may be selected for body 102 depending on the desired application for the valve 100. For example, materials may be selected for body 102 of valve 100 which are resistant to corrosion, heat, moisture, rust, and/or bacterial growth.

Valve 100 may include a stem 104. Stem 104 may transmit motion from a handle, actuator, and/or other controlling device (e.g., external actuator 130) to a movable valve member 120. For example, in a ball valve (e.g., a valve in which valve member 120 is a ball), stem 104 may be operatively coupled to the ball such that rotating the stem 104 using a handle or other actuator of the valve may, in turn, rotate the ball between an open position and a closed position to control a flow of fluid through a fluid flow path of the valve. Various types of valves along with their corresponding actuation mechanisms and valve members (sometimes referred to as "discs") may be used in accordance with embodiments of the present disclosure. In a few examples, gate valves, ball valves, globe valves, butterfly valves, plug valves, poppet valves, needle valves, and/or spool valves may be used in accordance with embodiments of the present disclosure depending on the desired valve type.

Body 102 of valve 100 may be formed in such a way as to define an enclosure such as cavity 112 depicted in FIG. 10. In some examples, cavity 112 may be formed from a portion of body 102 with a smaller diameter and/or cross-sectional width relative to other portions of valve body 102. Additionally, in some examples, portions of body 102 defining cavity 112 may be relatively thin so as to transmit magnetic flux from external magnets 106a, 106b into cavity 112. For example, the portions of body 102 adjacent to external magnets 106a, 106b may be of a thickness such that magnetic flux passes from external magnet 106a, through internal actuator components 110a, 110b, and to external magnet 106b. In valve 100, stem 104 may be entirely contained within the body 102 of the valve 100 such that no portion of the stem 104 extends outside of body 102.

In some examples, cavity 112 may be cylindrical. In various further examples, external actuator 130 may comprise an annular base portion concentric with the cylindrical cavity 112. External magnets 106a, 106b may be disposed on a first portion of the annular base portion of external actuator 130. As previously described, external actuator 130 may comprise a ferromagnetic material to complete a magnetic circuit for magnetic flux flowing between external magnets 106a, 106b through actuator components 110a, 110b. A first magnetic pole section of external magnet 106a may be disposed adjacent to a first location of the annular base portion of external actuator 130. Similarly, a second magnetic pole section of external magnet 106b may be disposed adjacent to a second location of the annular base portion of external actuator 130.

Actuator components 110a and/or 110b may be located inside an enclosure of the valve and may be mechanically coupled to stem 104. Accordingly, rotation of actuator components 110a and 110b may rotate stem 104, which may, in turn, actuate movement of valve member 120 between an open position and a closed position in seat 118. As depicted in FIG. 10, actuator components 110a and 110b may be enclosed within cavity 112 such that actuator components 110a and 110b are not exposed to the exterior of body 102 of valve 100. In some examples, actuator components 110a and 110b may comprise a material having a high magnetic permeability such that magnetic flux flows from an external magnet (such as, for example, external magnets 106a, 106b) through actuator components 110a and 110b and returns to either the same external magnet or a different external magnet. In some examples, actuator components 110a and 110*b* may comprise one or more ferromagnetic materials such as iron, nickel, cobalt and/or alloys thereof. In another example, actuator components 110*a* and 110*b* may comprise 400 series stainless steel. Although actuator components 110*a* and 110*b* may comprise one or more materials having high magnetic permeability, in various examples, actuator components 110*a*, 110*b* may not include permanent magnets (e.g., actuator components 110*a*, 110*b* may comprise an impermanently magnetic material). However, in various other examples, actuator component 110*a* and/or actuator component 110*b* may include one or more permanent magnets. In examples where actuator components 110*a*, 110*b* do not include permanent magnets, actuator components 110*a* and 110*b* and/or materials of actuator components 110*a* and 110*b* may be temporarily magnetized while actuator components 110*a* and 110*b* is exposed to magnetic fields of magnetic pole sections of external magnets 106*a*, 106*b*.

In some examples, actuator components 110*a* and 110*b* may be non-radially symmetric. For example, as depicted in FIGS. 3-6, actuator components 110*a*, 110*b* may have a longitudinal axis (e.g., the horizontal length of the components as depicted in FIGS. 5 and 6) that is longer than a lateral axis (e.g., the vertical length of the components as depicted in FIGS. 5 and 6). For example, actuator components 110*a* and 110*b* may comprise an elongate actuator component with a first end aligned with a first magnetic pole section of external magnet 106*a* and a second end aligned with a second magnetic pole section of magnet 106*b*, in a preferred orientation. Additionally, in some examples, actuator components 110*a* and 110*b* may comprise a material of high magnetic permeability, such as iron or 400 series stainless steel, embedded within a material of low magnetic permeability, such as ceramic. In some examples, the embedded material may form a path within the ceramic material such that magnetic flux flows along the path when a magnetic field interacts with actuator components 110*a* and 110*b*.

In some examples, external actuator 130 may comprise a handle, lever, or other actuation mechanism effective to rotate external magnets 106*a*, 106*b* around body 102. In various examples, motors may be used to turn the handle and/or control actuation of external actuator 130. Generally, when the handle is not being turned or otherwise actuated, the actuator components 110*a* and 110*b* maintains its current position and thus the valve member 120 remains in its current state. Although external actuator 130 is depicted in FIG. 10 as being above the valve body 102, in some examples, external actuator 130 may be in-plane with external magnets 106*a*, 106*b* or underneath external magnets 106*a*, 106*b*. In some examples, external actuator 130 may comprise a ferromagnetic material to form a return flow path for magnetic flux flowing from external magnet 106*a*, through actuator components 110*a* and 110*b*, to external magnet 106*b*, and through ferromagnetic external actuator 130 to return to external magnet 106*a*. It should be appreciated that in various other examples, magnetic flux may flow from external magnet 106*b*, through actuator components 110*a* and 110*b*, to external magnet 106*a*, and through ferromagnetic external actuator 130 to return to external magnet 106*b*.

Magnetic flux from external magnets 106*a*, 106*b* may be effective to orient actuator components 110*a* and 110*b* in a preferred orientation (e.g., aligned or deflected) with respect to the magnetic pole sections of external magnets 106*a*, 106*b*.

In still other examples described in further detail below, external magnet 106*a* may include a north pole section and south pole section. In such an example, magnetic flux may flow from the north pole section of external magnet 106*a*, through a flux path in actuator components 110*a* and 110*b*, and return from actuator components 110*a* and 110*b* to the south pole section of external magnet 106*a*. Similarly, in another example, external magnet 106*b* may include a north pole section and south pole section. In such an example, magnetic flux may flow from the north pole section of external magnet 106*b*, through a flux path in actuator components 110*a* and 110*b*, and return from actuator components 110*a* and 110*b* to the south pole section of external magnet 106*b*.

External magnets 106*a* and 106*b* may comprise, for example, permanent magnets such as Neodymium Iron Boron magnets, Samarium Cobalt magnets, Alnico magnets, Ceramic and/or Ferrite magnets. Examples of different Neodymium magnets may include N42, N52, and N42SH grade Neodymium magnets. Different magnets may exhibit different magnetic field strengths (in terms of Gauss and/or Teslas) and different pull forces. As such, different magnets may produce different amounts of torque in actuator components 110*a* and 110*b* when the magnets are rotated around the exterior of cavity 112. In some examples, external magnets 106*a* and/or 106*b* may comprise combinations of different permanent magnets. Additionally, in some examples, external magnets 106*a* and/or 106*b* may comprise electromagnets.

By sealing stem 104 within body 102 of valve 100, a stem seal may be avoided. A stem seal is an interface through which a stem passes between the interior of a valve and the exterior of the valve. Dirt and/or other contaminants can be introduced at the stem seal and can cause a leak in the stem seal. The stem seal may differ in hardness or coefficient of thermal expansion from the surrounding materials, such as the stem, bonnet, and/or valve body, and hence may not seal consistently over time and over varying temperatures. As such, for many applications it may be advantageous to seal the stem within the body of the valve 100, as described herein.

Valve 100 may include ports 122 and 124. Although in the example depicted in FIG. 10, two ports are shown, more ports may be used depending on the particular valve. Ports 122 and 124 may be inlet and/or outlet ports. Additionally, in some examples, ports 122 and 124 may be interchangeable as inlet ports and outlet ports depending on the way valve 100 is installed in a system.

As described above, rotation of external actuator 130 (and thus external magnets 106*a*, 106*b*) may cause corresponding rotation of internal actuator components 110*a*, 110*b*. Rotation of actuator components 110*a* and 110*b* may actuate stem 104 (depicted in FIG. 1) which may, in turn, actuate movement of valve member 120 between the open and closed position or between the closed and open position, depending on the direction of rotation of internal actuator component 110.

In the closed position shown in FIG. 10, torque and hence force available to press the gate against the valve seat in the closed position is limited by the asymmetric torque mechanism comprised of deflected actuator components 110*a* and 110*b* (see, e.g., FIG. 9), but additional torque (e.g., +20%) may available to break the gate free from the seat when opening the valve due to the aligned nature of the actuator components 110*a*, 110*b* (see, e.g., FIG. 8) hence preventing the valve from becoming stuck in a closed position.

In various examples, actuator component 110*a* may be attached to the inner stem 104. In various examples, actuator component 110*a* may be attached to the stem 104 with a pin 111. In various other examples, actuator component 110a may be fixed to stem 104 using a setscrew or shaped feature such as a square or hexagonal portion of a shaft of stem 104. In other examples, actuator component 110a may be press fit, welded, or adhered to stem 104. In yet other examples, stem 104 (or a portion thereof) and actuator component 110a may be formed from a single piece of metal. In contrast to actuator component 110a that may rotate with stem 104, actuator component 110b may pivot when rotated in one direction (see, e.g., FIG. 9), but may align with and lock against actuator component 110a (and hence the shaft of stem 104) when rotated in the other direction (see, e.g., FIG. 8).

Figure 11:
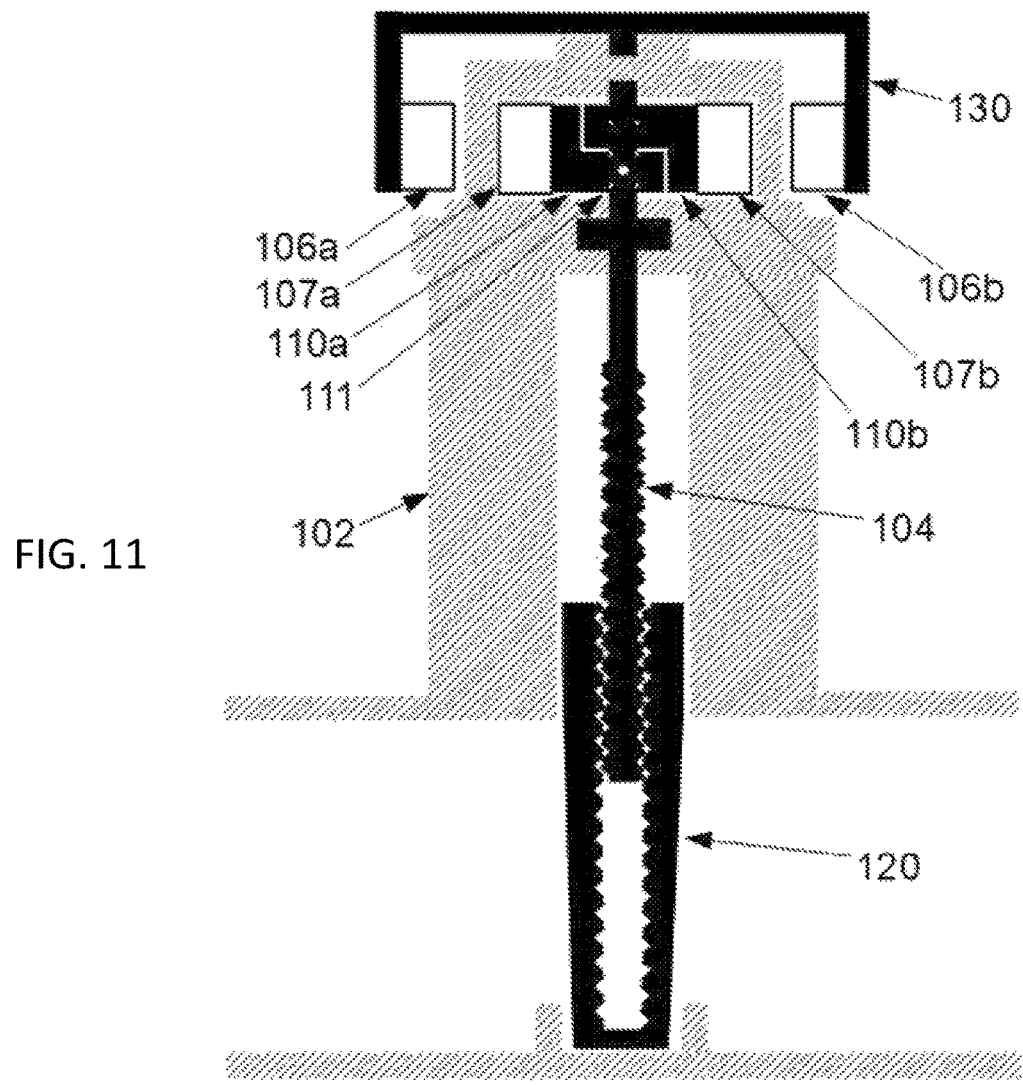
FIG. 11 depicts an assembled cross-sectional side view (perpendicular to the axis of rotation) of a magnet-actuated gate valve with an active magnetic actuator in its closed position that exhibits asymmetric torque, in accordance with some aspects of the present disclosure.

FIG. 11 depicts a cross-sectional side view of a similar gate valve to that shown in FIG. 10. However, in FIG. 11, actuator components 110a, 110b include internal permanent magnets 107a, 107b. Those components of FIG. 11 previously described with reference to FIGS. 1-10 may not be described herein for purposes of brevity and clarity. In the closed position shown in FIG. 11, torque and hence force available to press the gate against the valve seat is limited by the asymmetric torque mechanism comprised of deflected actuator components 110a and 110b (see, e.g., FIG. 9), but additional torque (e.g., +20%) may available to break the gate free from the seat when opening the valve due to the aligned nature of the actuator components 110a, 110b (see, e.g., FIG. 8) hence preventing the valve from becoming stuck in a closed position.

Figure 12:
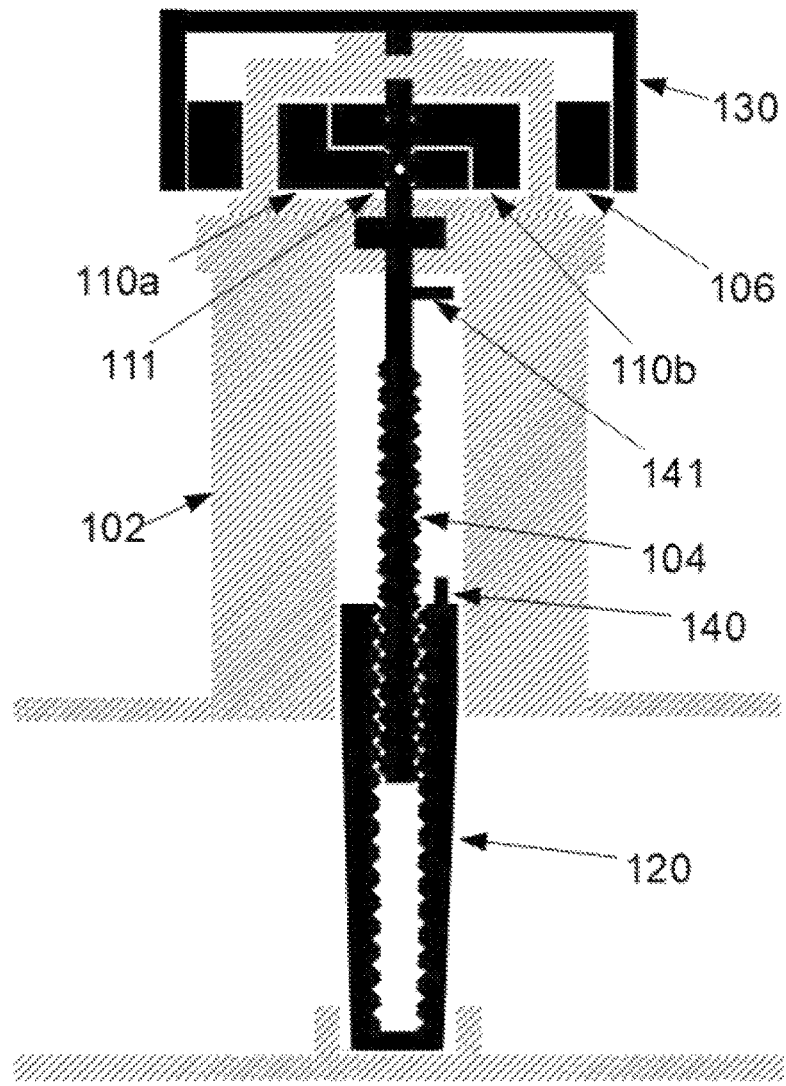
FIG. 12 depicts an assembled cross-sectional side view (perpendicular to the axis of rotation) of a magnet-actuated gate valve with ferromagnetic actuator in its closed position that exhibits asymmetric torque, and has rotational position stops, in accordance with some aspects of the present disclosure.

FIG. 12. depicts a cross-sectional side view of a gate valve, in its closed position with ferromagnetic actuator that exhibits asymmetric torque, and has pin type rotational position stops 140, 141 in the opening direction, in accordance with some aspects of the present disclosure. Those components of FIG. 12 previously described with reference to FIGS. 1-11 may not be described herein for purposes of brevity and clarity. In the closed position shown in FIG. 12, torque and hence force available to press the gate against the valve seat is limited by the asymmetric torque mechanism comprised of deflected actuator components 110a and 110b (see, e.g., FIG. 9), but additional torque (e.g., +20%) may be available to break the gate free from the seat when opening the valve due to the aligned nature of the actuator components 110a, 110b (see, e.g., FIG. 8) hence preventing the valve from becoming stuck in a closed position.

Figure 13:
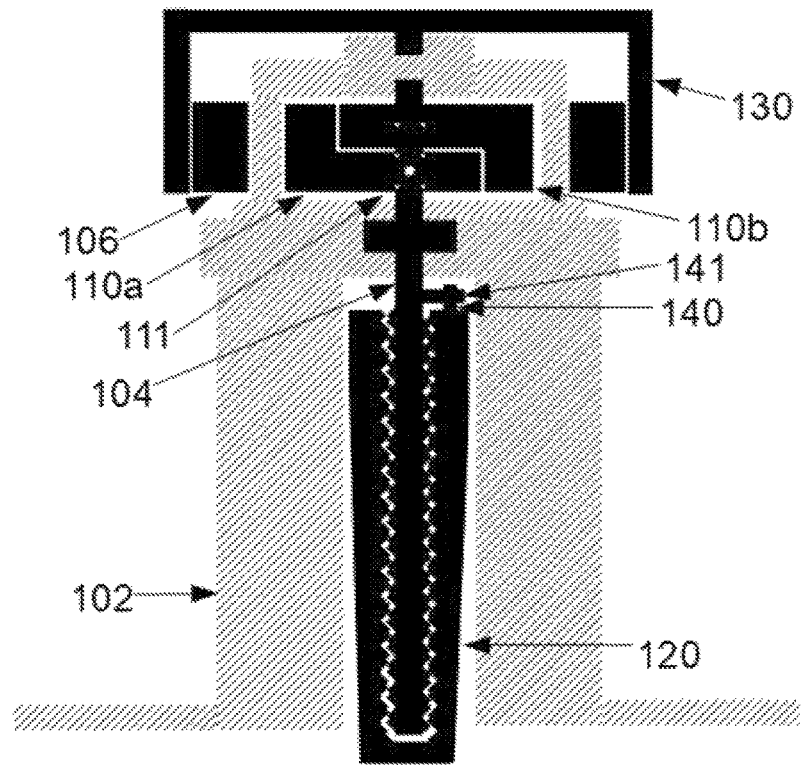
FIG. 13 depicts an assembled cross-sectional side view (perpendicular to the axis of rotation) of a magnet-actuated gate valve with ferromagnetic actuator in its open position that exhibits asymmetric torque, and has pin type rotational position stops, in accordance with some aspects of the present disclosure.

FIG. 13 depicts a cross-sectional side view of the gate valve of FIG. 12, but in an open position (full counter-clockwise position of the movable valve actuator component), in accordance with various aspects of the present disclosure. Those components of FIG. 13 that have been previously discussed in reference to FIGS. 1-12 may not be discussed again herein for purposes of clarity and brevity. In this open position, the pin type rotational position stops 140, 141 serve to stop rotation in the counter-clockwise direction past the point where the valve is full open preventing the valve from being stuck in the open position due to the valve gate contacting some portion of the interior of body 102 of the valve or the threads on stem 104 bottoming out in gate 120. However, the rotational position stops 140, 141 allow actuation in the reverse direction (e.g., the clockwise direction) allowing the valve to be closed again.

Figure 14:
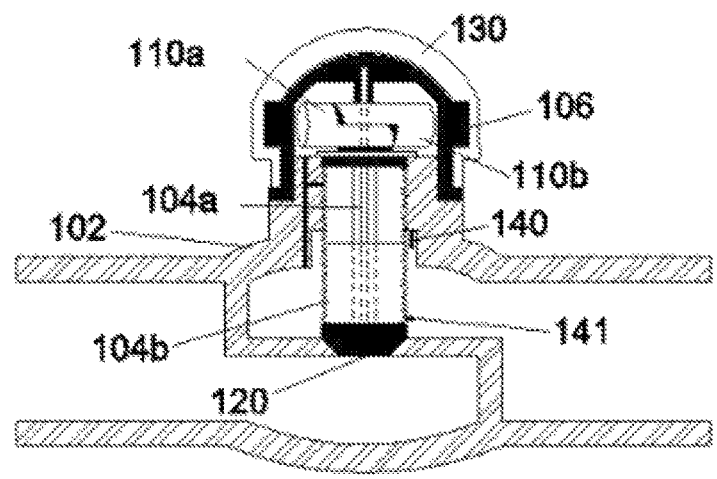
FIG. 14 depicts an assembled cross-sectional side view (perpendicular to the axis of rotation) of a magnet-actuated globe valve with ferromagnetic actuator in its closed position that exhibits asymmetric torque, and has pin type rotational position stops, in accordance with some aspects of the present disclosure.

FIG. 14. depicts a cross-sectional side view of a globe valve, in its closed position with a ferromagnetic actuator including actuator components 110a and 110b that exhibits asymmetric torque. Additionally, the globe valve depicted in FIG. 14 comprises pin type rotational position stops 140, 141 in the opening direction, in accordance with some aspects of the present disclosure. Those components of FIG. 14 previously described with reference to FIGS. 1-13 may not be described herein for purposes of brevity and clarity. In the closed position depicted in FIG. 14, torque and hence force available to press the globe against the valve seat is limited by the asymmetric torque mechanism comprised of actuator components 110a and 110b, but additional torque (typically 20% more) is available to break the globe free from the seat in order to open the valve hence preventing it from becoming stuck.

Figure 15:
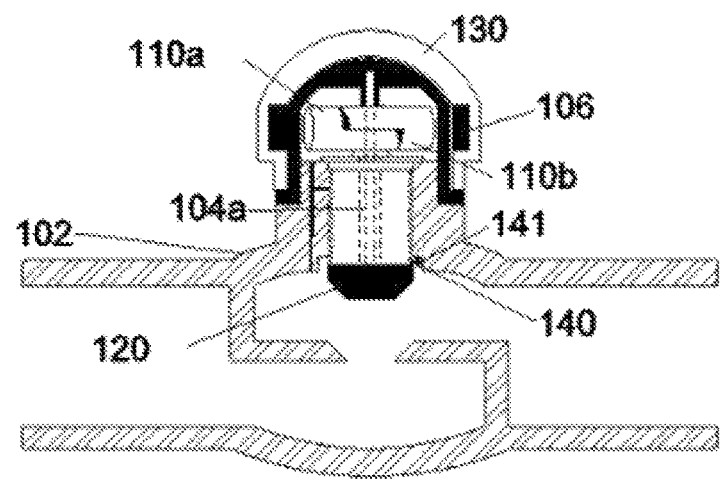
FIG. 15 depicts an assembled cross-sectional side view (perpendicular to the axis of rotation) of a magnet-actuated globe valve with ferromagnetic actuator in its open position that exhibits asymmetric torque, and has pin type rotational position stops, in accordance with some aspects of the present disclosure.

FIG. 15 depicts a cross-sectional side view of the globe valve of FIG. 14 in an open position (full counter-clockwise position of the movable valve actuator component), in accordance with various aspects of the present disclosure. Those components of FIG. 15 that have been previously discussed in reference to FIGS. 1-14 may not be discussed again herein for purposes of clarity and brevity. In the open position, pin type rotational position stops 140 and 141 serve to stop rotation in the counter clockwise direction past the point where the valve is full open, but allow actuation to reverse to close the valve again.

Figure 16:
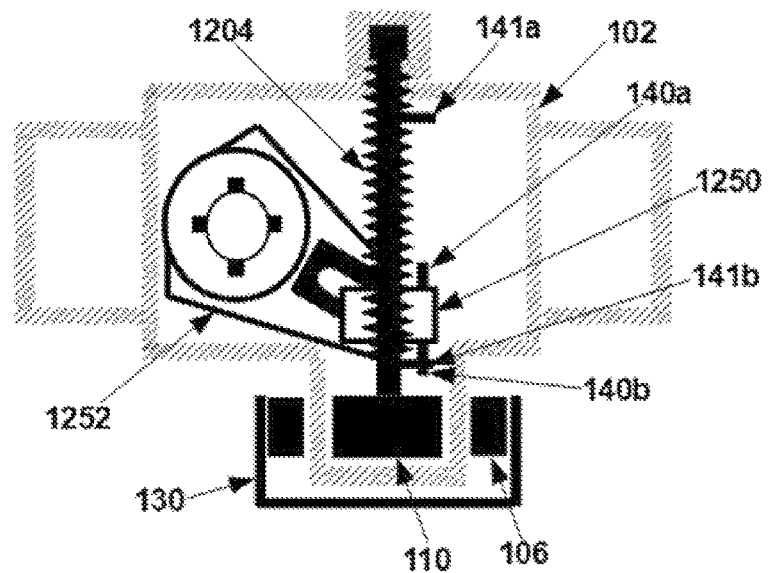
FIG. 16 depicts an assembled top view (along to the axis of rotation) of the inner, outer, and sealed enclosure portions of a magnet-actuated travelling nut valve actuator that has pin type rotational position stops, at its maximum clockwise rotation, in accordance with some aspects of the present disclosure.

FIG. 16 depicts a cross-sectional top view of a travelling nut actuation mechanism coupled to the stem of a magnet-actuated valve actuator that has pin type position stops, in a closed position (or most clockwise position of the movable valve actuator component), in accordance with various aspects of the present disclosure. Those components of FIG. 16 previously described with reference to FIGS. 1-15 may not be described herein for purposes of brevity and clarity. In various valve types that require a high amount of torque to operate, a traveling nut architecture may be used to increase the torque provided by the magnetic actuation mechanism described herein. Accordingly, in some examples in accordance with various embodiments described herein, the actuation mechanism of a valve may include a stem 1204 with a helical ridge effective to be mated to a traveling nut 1250. As internal actuator component 110 rotates, traveling nut 1250 may move up (or down, depending on the direction of rotation) stem 1204. In at least some examples, actuator component 110 may include actuator components 110a and 110b. Accordingly, in some examples, the valves depicted in FIGS. 16 and 17 may include asymmetric torque magnetic valve actuators, as described herein.

Upwards and downwards movement of traveling nut 1250 may, in turn, rotate a lever 1252. The lever 1252 may produce an increased torque when rotated relative to rotation of stem 1204 alone. Turning lever 1252 may actuate the valve actuator component between an open and a closed position. Pin type rotational stops 140a and 141a serve to stop rotation in the clockwise direction past the point where the valve is full closed, but allow actuation to easily reverse to open the valve again.

Figure 17:
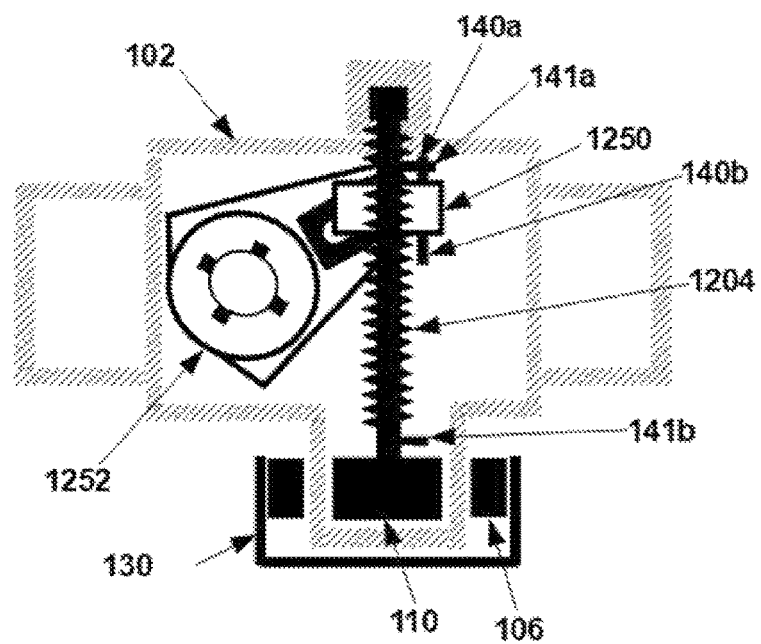
FIG. 17 depicts an assembled top view (along to the axis of rotation) of the inner, outer, and sealed enclosure portions of a magnet-actuated travelling nut valve actuator that has pin type rotational position stops, at its maximum counter-clockwise rotation, in accordance with some aspects of the present disclosure.

FIG. 17 depicts a cross-sectional top view of the travelling nut actuation mechanism of FIG. 17, but in an open position (or most counter-clockwise position of the movable valve actuator component), in accordance with various aspects of the present disclosure. Those components of FIG. 17 that have been previously discussed in reference to FIGS. 1-16 may not be discussed again herein for purposes of clarity and brevity. In the open position depicted in FIG. 17, pin type rotational stops 140b and 141b serve to stop rotation in the clockwise direction past the point where the valve is full open, but allow actuation to reverse to close the valve again.

Figure 18:
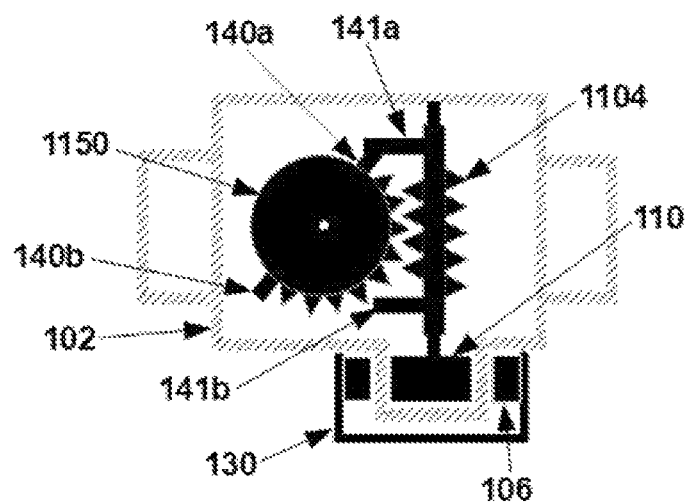
FIG. 18 depicts an assembled top view (along to the axis of rotation) of the inner, outer, and sealed enclosure portions of a magnet-actuated worm gear valve actuator that has pin type rotational position stops, at its maximum clockwise rotation, in accordance with some aspects of the present disclosure.

FIG. 18 depicts a cross-sectional top view of a worm gear 1150 coupled to an actuation mechanism of a magnet-actuated valve actuator that has pin type rotational stops, in a closed position (or most clockwise position of the movable valve actuator component), in accordance with various aspects of the present disclosure. Those components of FIG. 18 that have been previously discussed in reference to FIGS. 1-17 may not be discussed again herein for purposes of clarity and brevity. Various valve types, such as ball valves and/or plug valves, may require higher torque to actuate relative to other types of valves, such as gate valves. Accordingly, in some examples in accordance with various embodiments described herein, the actuation mechanism of a valve may include a stem 1104 with a helical ridge (sometimes referred to as a "worm") effective to turn a worm gear 1150. The worm gear 1150 may produce an increased torque when rotated relative to rotation of stem 1104 alone. Turning worm gear 1150 may actuate the valve actuator component between an open and a closed position. Pin type rotational stops 140a and 141a may serve to stop rotation in the clockwise direction past the point where the valve is full closed, but allow actuation to reverse to open the valve again.

Figure 19:
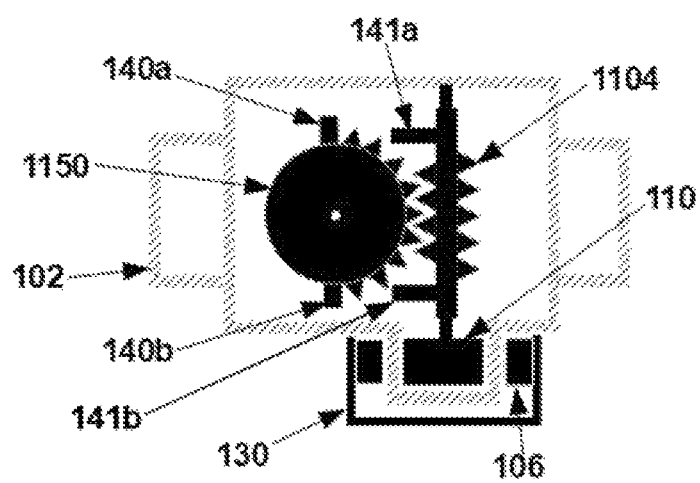
FIG. 19 depicts an assembled top view (along to the axis of rotation) of the inner, outer, and sealed enclosure portions of a magnet-actuated worm gear valve actuator that has pin type rotational position stops, near the midpoint of its rotation, in accordance with some aspects of the present disclosure.

FIG. 19 depicts a cross-sectional top view of the worm gear mechanism of FIG. 18, but in an intermediate or mid-actuation position of the movable valve actuator component, in accordance with various aspects of the present disclosure. Those components of FIG. 18 that have been previously discussed in reference to FIGS. 1-18 may not be discussed again herein for purposes of clarity and brevity.

Figure 20:
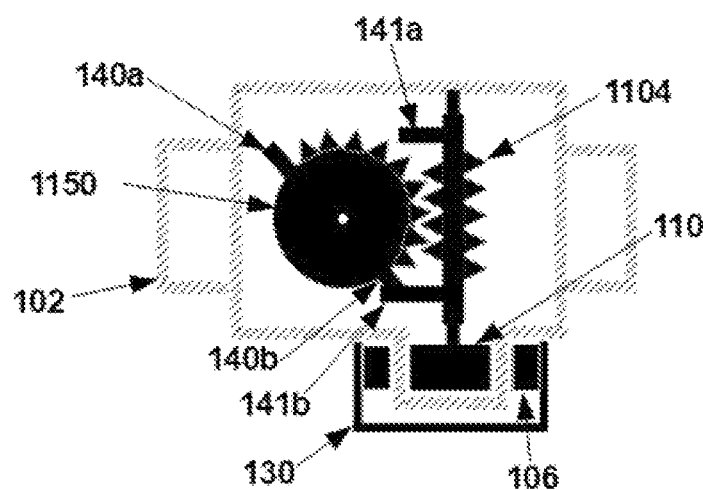
FIG. 20 depicts an assembled top view (along to the axis of rotation) of the inner, outer, and sealed enclosure portions of a magnet-actuated worm gear type valve actuator that has pin type rotational position stops, at its maximum counter-clockwise rotation, in accordance with some aspects of the present disclosure.

FIG. 20 depicts a cross-sectional top view of the worm gear mechanism of FIGS. 18 and 19, but in an open position (e.g., a full counter-clockwise position of the movable valve actuator component), in accordance with various aspects of the present disclosure. Those components of FIG. 18 that have been previously discussed in reference to FIGS. 1-18 may not be discussed again herein for purposes of clarity and brevity. In this position, pin type rotational stops 140b and 141b may serve to stop rotation in the clockwise direction past the point where the valve is fully open, but allow actuation to reverse to close the valve again.

Figure 21:
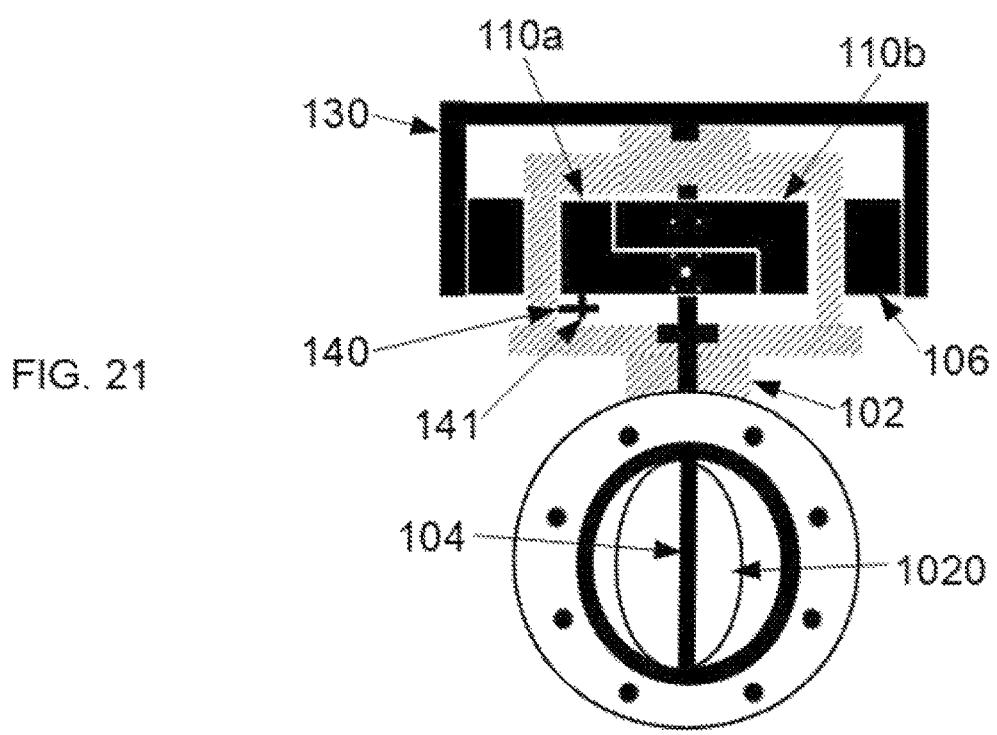
FIG. 21 depicts an assembled a cross-sectional side view (perpendicular to the axis of rotation) of a magnet-actuated butterfly valve with ferromagnetic actuator in a mid-rotation position that exhibits asymmetric torque, and has pin type rotational position stops, in accordance with some aspects of the present disclosure.

FIG. 21 depicts an assembled cross-sectional side view (perpendicular to the axis of rotation) of a magnet-actuated butterfly valve with ferromagnetic actuator in a mid-rotation position that exhibits asymmetric torque, and has pin type rotational stops in the opening direction, in accordance with some aspects of the present disclosure. Those components in FIG. 21 that have been described previously with reference to FIGS. 1-20 may not be described again for purposes of clarity and brevity. In the magnet-actuated butterfly valve depicted in FIG. 21, the valve member 120 may be a plate 1020 configured to rotate between an open and a shut configuration with the rotation of stem 104. Stem 104 may, in turn, be coupled to and rotate with internal actuator components 110a and 110b. As previously discussed, actuator components 110a and 110b may rotate due to torque caused by rotation of external magnets 106. Pin type rotational stops 140 and 141 may serve to stop rotation in the opening direction past the point where the valve is full opened, but allow actuation to easily reverse to close the valve again. The internal portion of the magnetic coupling comprised of components 110a and 110b serve to limit the torque available to close the butterfly plate 1020 against its seat, but provide more torque to open it again if it becomes stuck in the closed position.

Figure 22:
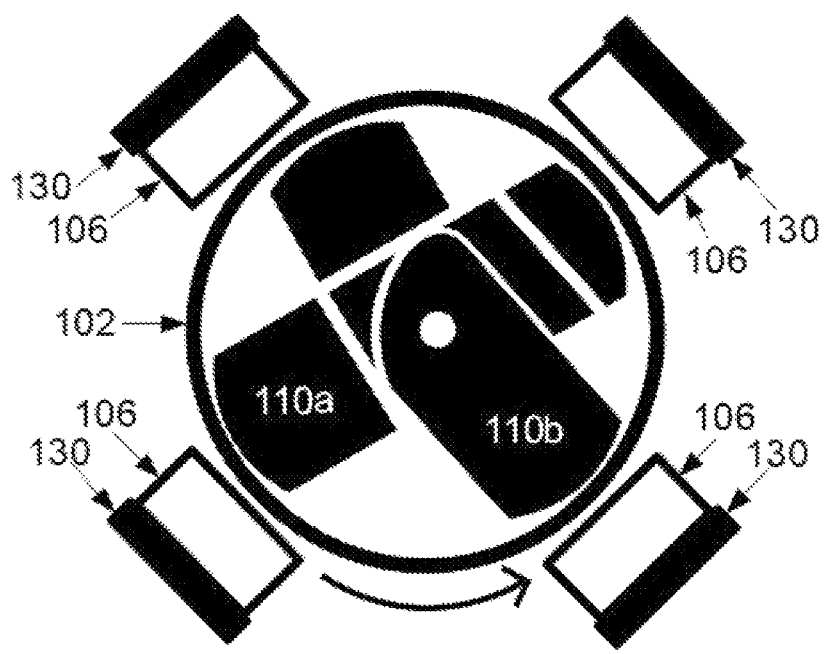
FIG. 22 depicts an assembled top view (along the axis of rotation) of a magnet-actuated valve actuator that has four external magnets in a co-planar arrangement with a single layer internal mechanism that exhibits asymmetric torque, in accordance with some aspects of the present disclosure.

FIG. 22 depicts an assembled top view (along the axis of rotation) of the inner, outer, and sealed enclosure portions of a magnet-actuated valve actuator that has four external magnets in a co-planar arrangement with a single layer internal mechanism and exhibits asymmetric torque, in its lower torque deflected position, in accordance with some aspects of the present disclosure. Those portions of FIG. 22 that have been previously described with reference to FIGS. 1-21 may not be described again herein for purposes of clarity and brevity. The example depicted in FIG. 22 displays external magnets 106 in a co-planar orientation with respect to one another. Using additional external magnets 106 may produce additional torque when rotating the external magnets 106 along with external actuator 130.

Figure 23:
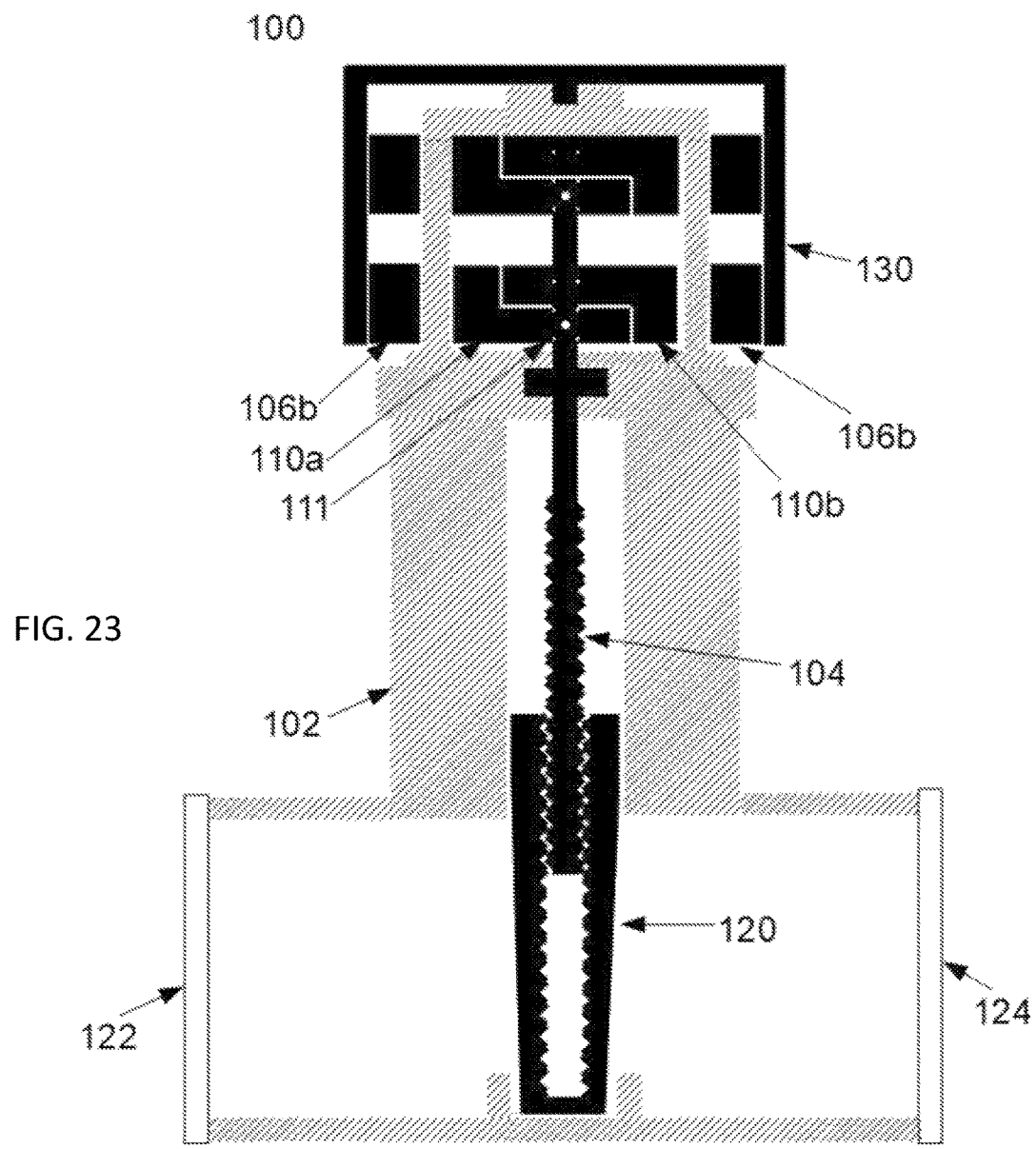
FIG. 23 depicts an assembled side view (perpendicular to the axis of rotation) of a magnet-actuated valve actuator that has four external magnets in a two layer arrangement along the axis of rotation and exhibits asymmetric torque, in accordance with some aspects of the present disclosure.

FIG. 23 depicts a cross-sectional side view of a magnet-actuated valve including four ferromagnetic actuation members and four external magnets in accordance with various aspects of the present disclosure. Those portions of FIG. 23 that have been previously described with reference to FIGS. 1-22 may not be described again herein for purposes of clarity and brevity. The example depicted in FIG. 23 displays external magnets 106 stacked in a vertical orientation with respect to one another. In some examples, each vertical layer of external magnets 106 may correspond with its own internal actuation member 110. In some other examples, there may be a single internal actuation member 110 that is actuated by rotating external magnets 106 and external actuator 130. As described previously, using additional external magnets 106 may produce additional torque when rotating the external magnets 106 along with external actuator 130.

Among other potential benefits, valves in accordance with embodiments of the present disclosure may alleviate the problem of valves becoming stuck in an open or closed position due to corrosion or build-up of materials on and/or in the valve. As previously described, the asymmetric torque magnetic valve actuators described herein may be effective to generate higher torque when opening the valve and reduced torque when closing the valve. Additionally, various rotational stops are described that may mechanically prevent the valves from being closed or open past a specific point. Use of such rotational stops may prevent the valve member from binding with the valve seat and/or with an interior portion of the valve body. Accordingly, the various embodiments described herein offer technological improvements over previous valve actuators and over magnetic valve actuators in particular.

While the invention has been described in terms of particular embodiments and illustrative figures, those of ordinary skill in the art will recognize that the invention is not limited to the embodiments or figures described.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one," "at least one" or "one or more." Unless otherwise required by context, singular terms used herein shall include pluralities and plural terms shall include the singular.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural and singular number, respectively. Additionally, the words "herein," "above," and "below" and words of similar import, when used in this application, shall refer to this application as a whole and not to any particular portions of the application.

The description of embodiments of the disclosure is not intended to be exhaustive or to limit the disclosure to the precise form disclosed. While specific embodiments and examples for the disclosure are described herein for illustrative purposes, various equivalent modifications are possible within the scope of the disclosure, as those skilled in the relevant art will recognize. Such modifications may include, but are not limited to, changes in the dimensions and/or the materials shown in the disclosed embodiments.

Specific elements of any embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A valve assembly comprising:
   a first actuator comprising:
      a first actuator component comprising an interfacing surface and rotational axis point, wherein the interfacing surface is a first distance from the rotational axis point; and
      a second actuator component comprising an interfacing end rotatably coupled to the first actuator component at the rotational axis point, and a free end distal to the interfacing end, wherein the interfacing end comprises:
         an abutting surface a second distance from the rotational axis point, the second distance being greater than the first distance, wherein the abutting surface abuts the interfacing surface of the first actuator component when the first actuator component is aligned with the second actuator component at a first angular displacement such that rotation of the second actuator component in a first direction beyond the first angular displacement causes the abutting surface to apply a force onto the interfacing surface of the first actuator component, thereby resulting in coordinated rotation of the first actuator component with the second actuator component; and
         a recessed surface a third distance from the rotational axis point, the third distance being less than or equal to the first distance, wherein rotation of the second actuator component in a second direction opposite the first direction results in rotation of the second actuator component relative to the first actuator component;
   a valve body defining an enclosure, wherein the first actuator component and the second actuator component are disposed in the enclosure;
   a third actuator component coupled to an exterior of the valve body, the third actuator component comprising a first magnetic pole section and a second magnetic pole section adjacent to the valve body; and
   wherein, when the first actuator component is aligned with the second actuator component at the first angular displacement, the first magnetic pole section is magnetically coupled to the first actuator component and the second magnetic pole section is magnetically coupled to the free end of the second actuator component, and rotation of the third actuator component in the first direction effectuates rotation of the first actuator in the first direction.

2. The valve assembly of claim 1, wherein:
at least one of the first actuator component and the second actuator component comprises a ferromagnetic material.

3. The valve assembly of claim 1, wherein:
at least one of the first actuator component and the second actuator component comprises a permanent magnet.

4. The valve assembly of claim 1, wherein:
at least one of the first actuator component and the second actuator component comprises an impermanent magnet.

5. The valve assembly of claim 1, further comprising:
a valve member effective to open and close a fluid flow path of the valve assembly; and
a valve stem operatively coupled to the first actuator and to the valve member.

6. The valve assembly of claim 5, further comprising:
a physical protrusion coupled to the valve stem, wherein the physical protrusion is arranged so as to contact a portion of the valve assembly to prevent further movement of the valve member in the first direction.

7. The valve assembly of claim 1, wherein:
the abutting surface comprises a substantially planar surface; and
the recessed surface comprises a curved surface.

8. A valve assembly comprising:
   a first actuator comprising:
      a first actuator component;
      a second actuator component rotatably coupled to the first actuator component, wherein at least one of the first actuator component and the second actuator component comprises at least one of a permanent magnet and an impermanent magnet, and wherein the second actuator component is effective to:
         rotate in a first direction until disposed in an aligned orientation with respect to the first actuator component, wherein the first actuator component is arranged so as to impede the second actuator component from rotating past the aligned orientation when rotated in the first direction; and
         rotate in a second direction opposite the first direction such that the second actuator component is disposed in a deflected orientation with respect to a longitudinal axis of the first actuator component.

9. The valve assembly of claim 8, further comprising:
a valve body defining an enclosure, wherein the first actuator is disposed in the enclosure;
a second actuator attached to an exterior of the valve body, the second actuator comprising:
   a first magnetic pole section adjacent to the valve body; and
   a second magnetic pole section adjacent to the valve body, wherein, when the second actuator is rotated in the first direction and the second actuator component is disposed in the aligned orientation, a first torque is experienced by the first actuator, and when the second actuator is rotated in the second direction and the second actuator component is disposed in the deflected orientation, a second torque is experienced by the first actuator, wherein the first torque is greater than the second torque.

10. The valve assembly of claim 8, further comprising:
a valve member effective to open and close a fluid flow path of the valve assembly;
a valve stem operatively coupled to the first actuator and to the valve member;
a first physical protrusion coupled to the valve stem; and
a second physical protrusion coupled to the valve member, wherein the first physical protrusion and the second physical protrusion are arranged so that the first physical protrusion contacts the second physical protrusion at a first position of the valve member to prevent further movement of the valve member in the first direction.

11. The valve assembly of claim 8, further comprising:
a valve member effective to open and close a fluid flow path of the valve assembly;
a valve stem operatively coupled to the first actuator and to the valve member; and
a physical protrusion coupled to the valve stem, wherein the physical protrusion is arranged so as to contact a portion of the valve assembly to prevent further movement of the valve member in the first direction.

12. The valve assembly of claim 8, further comprising:
a valve member effective to open and close a fluid flow path of the valve assembly, wherein the valve member is operatively coupled to the first actuator; and
a physical protrusion coupled to the first actuator, wherein the physical protrusion is arranged so as to contact a portion of the valve assembly to prevent further movement of the valve member in the first direction.

13. The valve assembly of claim 8, further comprising:
a valve body defining an enclosure, wherein the first actuator is disposed in the enclosure; and
a second actuator attached to an exterior of the valve body, the second actuator comprising:
a first magnetic pole section adjacent to the valve body; and
a second magnetic pole section adjacent to the valve body, wherein, when the second actuator is rotated in the first direction, a first torque is experienced by the first actuator and when the second actuator is rotated in the second direction, a second torque is experienced by the first actuator, wherein the first torque is greater than the second torque, wherein the first actuator is sealed in the enclosure such that the second actuator is not mechanically coupled to the first actuator or to a stem of the valve assembly.

14. The valve assembly of claim 13, wherein the second torque is less than or equal to a recommended valve seating torque of the valve assembly.

15. A valve assembly, comprising:
an external actuator comprising at least one magnet;
a ferromagnetic actuator, wherein the ferromagnetic actuator is arranged so that a first torque is experienced by the ferromagnetic actuator when the external actuator is rotated in a clockwise direction and a second torque, different from the first torque, is experienced by the ferromagnetic actuator when the external actuator is rotated in a counterclockwise direction;
a valve member effective to open and close a fluid flow path of the valve assembly; and
a rotational stop feature coupled to a stem of the valve assembly or to the ferromagnetic actuator, wherein the rotational stop feature is arranged so as to contact a portion of the valve assembly to prevent further movement of the valve member in a first direction.

16. The valve assembly of claim 15, wherein the first torque is less than the second torque.

17. The valve assembly of claim 15, wherein the ferromagnetic actuator comprises an impermanent magnet.

* * * * *